United States Patent [19]
Tsunoda

[11] 4,344,735
[45] Aug. 17, 1982

[54] METHOD OF CONTROLLING TWO-STAGE HYDRAULIC PUMP-TURBINES

[75] Inventor: Sachio Tsunoda, Yokohama, Japan

[73] Assignee: Tokyo Shibaura Denki Kabushiki Kaisha, Kanagawa, Japan

[21] Appl. No.: 180,561

[22] Filed: Aug. 25, 1980

[30] Foreign Application Priority Data

Aug. 28, 1979 [JP] Japan .................................. 54/109288

[51] Int. Cl.³ .............................................. F01B 17/14
[52] U.S. Cl. ......................................... 415/1; 415/24; 415/500
[58] Field of Search .................. 415/1, 13, 24, 45, 500

[56] References Cited
U.S. PATENT DOCUMENTS 4,255,078 3/1981 Tsunoda et al. ........................ 415/1
4,280,788 7/1981 Tsunoda et al. ........................ 415/1

FOREIGN PATENT DOCUMENTS 54-8237 1/1979 Japan ...................................... 415/1
54-108143 8/1979 Japan ...................................... 415/1

Primary Examiner—Louis J. Casaregola
Attorney, Agent, or Firm—Stevens, Davis, Miller and Mosher

[57] ABSTRACT

A method of controlling a two-stage hydraulic pump-turbine, rotating at a constant speed under a steady condition, in which high and low pressure stages are connected through a return passage. The variable degrees of openings of movable guide vanes of the high and low pressure stages are equally controlled to the same extent when the hydraulic pump-turbine operates as a pump and independently controlled to the different extents when the pump-turbine operates as a turbine in accordance with a change of an operational condition such as water level or load at a time of the steady operation.

4 Claims, 9 Drawing Figures

METHOD OF CONTROLLING TWO-STAGE HYDRAULIC PUMP-TURBINES

BACKGROUND OF THE INVENTION

This invention relates to a method of operating a two-stage hydraulic machine, and more particularly, a method of operating a two-stage hydraulic pump-turbine operated at a constant speed under a steady operating condition in which movable guide vanes are disposed at the respective pressure stages which are connected in series with each other by a return passage.

Generally, in a single-stage pump-turbine, a plurality of movable guide vanes are annularly disposed between a runner chamber and a vortex chamber of a spiral case, and a valve is located at an inlet portion of the vortex chamber on the upstream side thereof. The amount of water flowing through the runner can be controlled by adjusting the degree of opening of guide vanes after the inlet valve has been completely opened. This controlling method is very suitable for and easily applicable to the operation of a single-stage hydraulic pump-turbine to increase hydraulic efficiency and operational stability of the pump-turbine.

However, in a multistage hydraulic pump-turbine in which respective stages are connected in series by a return passage, it is considerably difficult to arrange guide vanes and a mechanism for operating them on each stage because of constructional and operational problems. Therefore, actually, in a known multistage hydraulic pump-turbine, the flow amount is controlled by adjusting the opening of the inlet valve located upstream of the spiral case.

Recently, requirements for a multistage hydraulic pump-turbine have been increased because of the requirements for installing a pumped storage power plant at a position having a high head. Particularly, it is required to develop a method of operating a pump-turbine of a small number of stages (i.e., two-stage) in which the movable guide vanes and an operating mechanism thereof are relatively easily arranged on the outer periphery of the runner of each stage.

FIG. 1 shows a typical two-stage hydraulic pump-turbine operated at a constant speed, in which a runner 2 of a high pressure stage and a runner 3 of a low pressure stage are axially located with space on a common shaft of the pump-turbine. The upper runner 2 is covered with upper and lower covers 4 and 5 to define a runner chamber 8 of the high pressure stage, and the lower runner 3 is covered with upper and lower covers 6 and 7 to define a runner chamber 9 of the low pressure stage. Both runner chambers 8 and 9 are connected with each other by a return passage 10. On the outside of the runner chamber 8 is located a spiral case 11 provided with a vortex or scroll chamber 12 communicated with the runner chamber 8. An inlet portion of the vortex chamber 12 is connected to a penstock 14 through an inlet valve 13. A plurality of movable guide vanes 15 and 16, the degrees of openings of which are constructed to be adjustable, are annularly disposed at the outer peripheral portions of the runners 2 and 3 of the high and low pressure stages, respectively. The guide vanes of each stage are operatively connected to an operating mechanism, not shown, through a control device to operate the pump-turbine under the normal condition.

The two-stage hydraulic pump-turbine constructed as described above is operated as a turbine in the following manner.

When fed from the penstock 14 to the centrifugal casing 11 through the inlet valve 13 passes successively through the movable guide vanes 15, the runner 2, the return passage 10, the movable guide vanes 16, and the runner 3. The water is then discharged into a tailrace, not shown, through a draft tube 17. On the other hand, when the hydraulic pump-turbine is operated as a pump at the same speed as that at a time when it operates as a turbine, the water pumped up by the runner 3 flows from the draft tube 17 to the penstock 14 through a course reverse to that described above.

Total hydraulic characterisics of the two-stage hydraulic pump-turbine may be given by combining hydraulic characteristics of the respective pressure stages. Therefore, in order to grasp problems of a two-stage hydraulic pump-turbine, it may be better to discuss in advance about problems regarding hydraulic characteristics of a single-stage hydraulic pump-turbine.

With the single-stage hydraulic pump-turbine, FIG. 2 shows curves representing the relationships between efficiencies on each opening degree of the guide vanes and unit rotating speeds of $N/\sqrt{H_t}$ and $N/\sqrt{H_p}$ when the pump-turbine is operated as a turbine and a pump, respectively, wherein N designates revolution per minute (rpm) of the pump-turbine, $H_t(m)$: the turbine net head and $72 t$: the turbine efficiency when operated as a turbine, and wherein the $H_p(m)$ designates effective pumping head and $\eta p$: the pump efficiency when the pump-turbine is operated as a pump.

As can be understood from FIG. 2, the rotating speed $N/\sqrt{H_{to}}$ at the most effective point as a turbine does not accord with the rotating speed $N/\sqrt{H_{po}}$ at the most effective point as a pump, and $N/\sqrt{H_{po}}$ is always larger than $N/\sqrt{H_{to}}$, which fact is an inevitable problem on hydraulic characteristics of a single speed reversible type hydraulic pump-turbine.

In an actual operation of a hydraulic pump-turbine, between these unit rotating speeds there is the following relation.

$$\frac{N/\sqrt{H_{po}}}{N/\sqrt{H_{to}}} = \sqrt{\frac{H_{to}}{H_{po}}} = 1.04 - 1.16 \quad (1)$$

This relation shows the fact on the hydraulic characteristics that the rotating speed $N/\sqrt{H_{po}}$ at the most effective point as a pump is considerably different from the rotating speed $N/\sqrt{H_{to}}$ at the most effective point as a turbine. Namely, in a pumped storage power plant operated at a predetermined normal water level, when it is determined that the hydraulic pump-turbine is operated as a pump at a rotating speed under the most or substantially the most effective condition, it must be operated as a turbine at the same rotating speed under a condition having a lower hydraulic operating efficiency.

In the followings, let us describe problems on the hydraulic characteristics under the normal operating condition of a two-stage hydraulic pump-turbine provided with runners having equal outer diameters (i.e., $D_1=D_2$ in FIG. 1) at the respective stages by taking into consideration the discussion about the single-stage hydraulic pump-turbine as described hereinbefore and with reference to FIG. 3.

In FIG. 3, $H_1$ designates the turbine net head in a high pressure stage, $H_2$: the turbine net head in a low pressure stage, Q: the water flow amount, $Q_0$: the water flow amount in a case when operated at the normal water level (normal condition O), $a_0$: the degree of opening of the guide vanes at each stage under the condition O, $a_n$ (N=1, 2, 3, ...): the degree of opening larger than $a_0$ under another condition, a−n (n=1, 2, 3, ...): degree of opening smaller than $a_0$ under another condition, and $\Delta\eta$: the relative efficiency difference with respect to the highest turbine efficiency. In FIG. 3 an abscissa represents a flow amount ratio $Q/Q_0$ and an ordinate represents effective head ratios $H_1/H_{10}$ and $H_2/H_{20}$ in the high and low pressure stages, respectively. Thus, FIG. 3 shows the relation between hydraulic characteristics of the effective head and flow amount. Thus, the total turbine net head of a two-stage hydraulic pump-turbine can be obtained by adding the turbine net heads of the respective stages.

Under the normal condition O (in FIG. 3) as a turbine in which the respective stages are operated under hydraulically equivalent conditions by fully opening the inlet valve 13, the following relations hold with reference to the turbine net heads of the respective stages.

$$\left.\begin{array}{l} H_{10} + H_{20} = H_0 \\ H_{10} = H_{20} = H_0/2 \end{array}\right\} \quad (2)$$

where $H_{10}$ and $H_{20}$ are turbine net heads of the high and low pressure stages and $H_0$ is the total turbine net head.

However, it should be noted that the normal condition O of each pressure stage is within an operating area considerably apart from the most effective condition (i.e., $\Delta\eta=0$) when the pump-turbine is operating as a turbine on the low head side. In this area, the pump-turbine is operated as a turbine at an increased unit rotating speed and with a low hydraulic efficiency and a water separation phenomenon is caused, thereby inducing secondary local flow resulting in the cavitation, vibration and noise. Moreover, the water separation phenomenon and the secondary local flow may often generate at a time when the pressure on the outlet side of the runner is lower than that on the inlet side thereof, and with a two-stage hydraulic pump-turbine, a pressure on the outlet side of the low pressure stage is considerably lower than that on the outlet side of the high pressure stage (corresponding to the inlet side of the low pressure stage). Therefore, it is important to determine how to stably control the operation of the low pressure stage of a two-stage hydraulic pump-turbine operating under the steady condition as a turbine.

SUMMARY OF THE INVENTION

Accordingly, an object of this invention is to provide a method of controlling the degree of opening of guide vanes of a two-stage hydraulic pump-turbine with respect to the changes of an operating head and an operation load so as to operate the pump-turbine hydraulically stably under the steady condition.

According to this invention, there is provided a method of controlling a two-stage hydraulic pump-turbine rotating at a constant speed under a steady condition, in which high and low pressure stages are connected through a return passage, and degrees of openings of movable guide vanes of the high and low pressure stages are variable, the method being characterized in that the degrees of openings of the guide vanes of the high and low pressure stages are equally controlled to the same extent when the two-stage hydraulic pump-turbine operates as a pump and independently controlled to the different extents when the pump-turbine operates as a turbine in accordance with a change of an operational condition at a time of the steady operation.

DESCRIPTION OF THE PREFERRED EMBODIMENT

Figure 4:
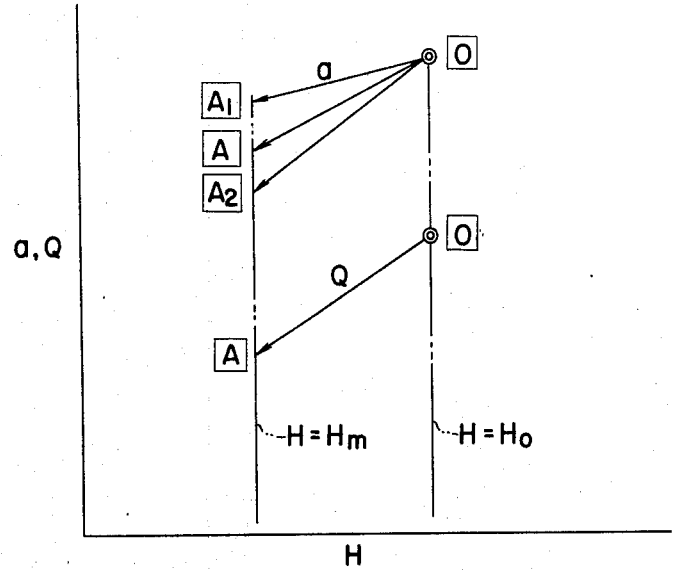
FIG. 4 is a graph showing a relation between a operating head and a degree of opening of the guide vanes when the hydraulic pump-turbine is operating as a turbine.

FIG. 4 shows a control mode, according to this invention, showing the relation between the degree of opening of guide vanes of a two-stage hydraulic pump-turbine and the variation of water level, i.e. head, at each pressure stage.

Referring to FIG. 4, it is assumed that a total turbine net head H changes from a normal head $H_0$ to a low head $H_m$ and that water flow amount Q varies from a normal condition O to a certain reduced condition A. In this case, the degree a of opening of the movable guide vanes 15 of the high pressure stage is controlled in accordance with a locus O→$A_1$, the degree of opening of the guide vanes 15 under the condition $A_1$ being larger than that under the condition A, and the degree a of opening of the guide vanes 16 of the low pressure stage is controlled in accordance with the locus O→$A_2$, the degree of opening of the guide vanes 16 under the condition $A_2$ being smaller than that under the condition A. Thus, the degrees of openings of the guide vanes 15 and 16 of the high and low pressure stages are controlled independently by the different controlling modes, respectively.

The degrees of openings of the guide vanes of the respective pressure stages along the loci O→$A_1$ and O→$A_2$ are controlled according to the following relation.

$$\left.\begin{array}{l} H_1 + H_2 = H \\ H_1 < H_2 \end{array}\right\} \quad (3)$$

where H is the total turbine net head and $H_1$ and $H_2$ are turbine net heads of the high and low pressure stages, respectively.

Figure 1:
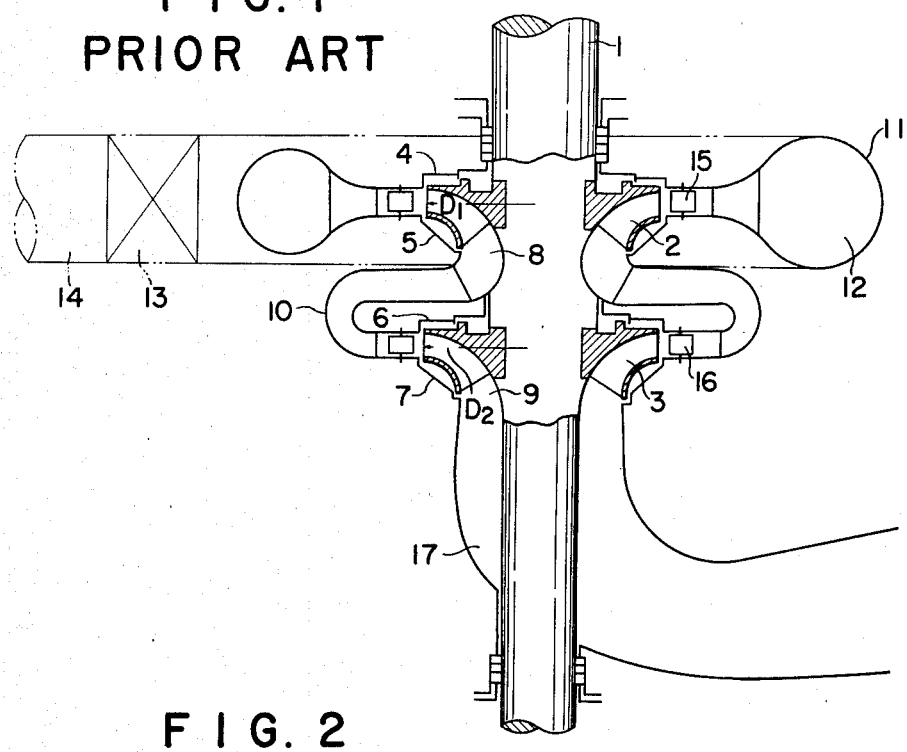
FIG. 1 is a schematic longitudinal sectional view of a typical two-stage hydraulic pump-turbine to which the invention is applicable.
Figure 2:
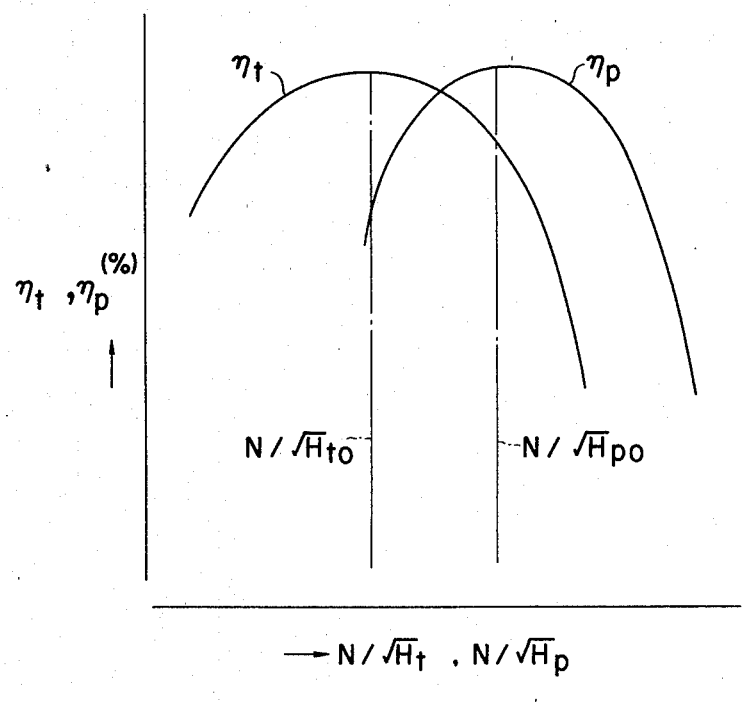
FIG. 2 shows a graph representing hydraulic characteristics when the hydraulic pump-turbine is operated as a turbine and a pump.
Figure 3:
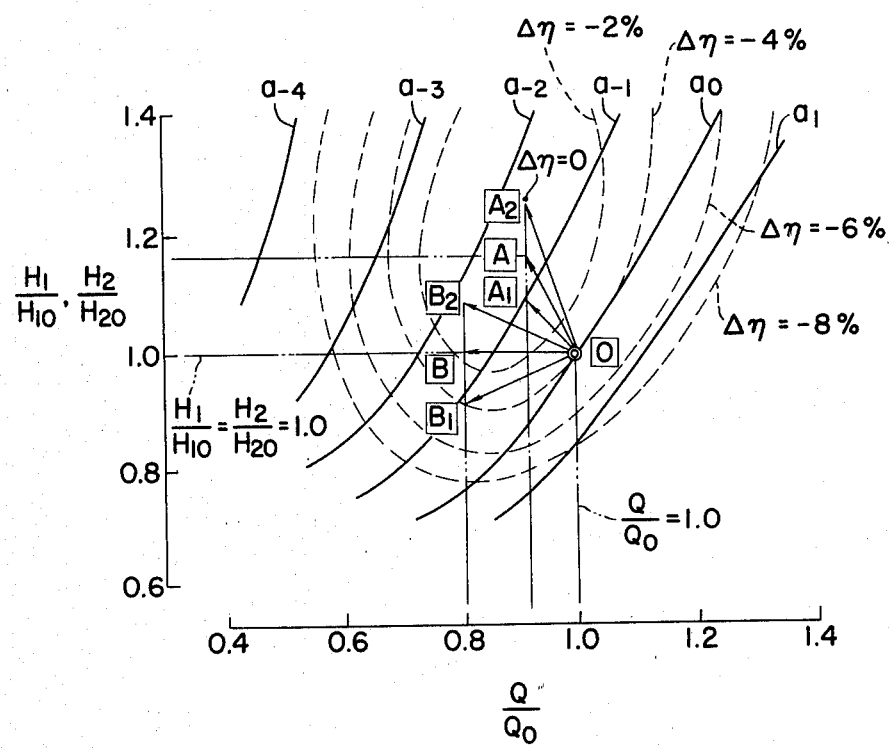
FIG. 3 is a graph showing hydraulic characteristics of the pump-turbine when it is operating as a turbine at the respective stages when the controlling method according to this invention is applied to the hydraulic pump-turbine shown in FIG. 1.

FIG. 3 shows hydraulic characteristics of the respective stages in a case where the degrees of openings of the guide vanes of the respective stages are independently controlled by the different controlling modes in accordance with the variation of the head as shown in FIG. 4. From FIG. 3 it will be understood that the operating condition of the high pressure stage, which is usually operated at a considerably high pressure on the outlet side of the runner of this stage under a hydraulically stable condition, passes through an area along the locus of the condition O→$A_1$ on the low head operating range rotated at a higher unit speed and with a lower hydraulic efficiency in comparison with a case when operated along the locus O→A under the standard condition. On the other hand, the operating condition of the low pressure stage, which is usually operated at a considerable low pressure on the outlet side of the runner of this stage under a hydraulically unstable condition, passes through an area on the high head operating range in which the pump-turbine is rotated at a lower unit speed in comparison with a case when operated along O→A under the standard condition, thus operating the pump-turbine with an improved hydraulic efficiency. Therefore, according to the controlling method described above, the two-stage hydraulic pump-turbine can be hydraulically stably operated under the steady operation in comparison with a case when the degrees of openings of the high and low pressure stages are equally controlled in accordance with the same control modes.

Figure 5:
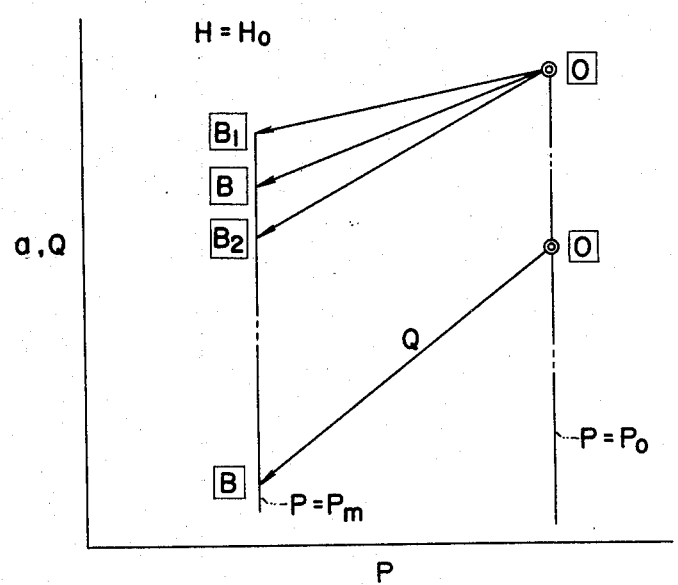
FIG. 5 is a graph showing a relation between load and degree of opening of guide vanes when the pump-turbine is operating as a turbine.

A method of controlling the degree of opening of the guide vanes in a case where the two-stage hydraulic pump-turbine operates as a turbine in which the head does not vary and the total operating load varies is described hereunder with reference to FIG. 5.

When a water flow amount Q varies along a locus O→B showing the transfer of a condition and the operating load P varies from $P_0$ to $P_m$ as the total turbine head is maintained to $H_0$, the degree of opening of the guide vanes 15 of the high pressure stage is controlled along the locus O→$B_1$ in which the degree a of opening is maintained to be larger than that controlled along the locus O→B, but the degree a of opening of the guide vanes 16 of the low pressure stage is controlled along the locus O→$B_2$ in which the degree of the opening is maintained to be smaller than that controlled along the locus O→B under the standard condition. Thus, the degrees of openings of the guide vanes 15 and 16 of the high and low pressure stages are controlled in accordance with different controlling modes.

The degrees of openings of the guide vanes of the respective pressure stages along the loci O→$B_1$ and O→$B_2$ are controlled by maintaining the following relation between the turbine net heads.

$$\left. \begin{array}{r} H_1 + H_2 = H \\ H_1 < H_2 \end{array} \right\} \quad (4)$$

FIG. 3 also shows the loci representing the hydraulic characteristics of the respective stages in a case where degrees of openings of the guide vanes are controlled in accordance with the control modes shown in FIG. 5 in conjunction with the variation of the load P. As can be understood from FIG. 3, the operating condition of the high pressure stage, which is usually operated at a considerably high pressure on the outlet side of the runner of this stage under a hydraulically stable condition, passes through an area along the locus of the condition O→$B_1$ on the low head operating range in which the pump-turbine is rotated at a higher unit speed and a lower hydraulic efficiency in comparison with a case when operated along the locus O→B of the standard condition. On the other hand, the operating condition of the low pressure stage, which is usually operated at a considerably low pressure on the outlet side of the runner of this stage under a hydraulically instable condition, passes through an area on the high head operating range in which the pump-turbine is rotated at a lower unit speed than a case when operated along the locus O→B under the standard condition, thus operating the pump-turbine with an improved efficiency. According to the controlling method described above, the two stage hydraulic pump-turbine can be operated more hydraulically stably under the steady operation in comparison with the case when the guide vanes of the high and low pressure stages are equally controlled by the same control mode.

Although the foregoing description relates to an embodiment of this invention in which the hydraulic characteristics of the respective stages are substantially equal with each other under the normal operation as a turbine, the subject matter of this invention resides in the relative control of the degrees of openings of the high and low pressure stages so as to operate the low pressure stage in a hydraulically stable area. Accordingly, it should be noted that the present invention includes also an embodiment in which the degree of opening of the guide vanes of the low pressure stage is controlled so as to be equal to or larger than that of the high pressure stage in a case where hydraulic characteristics of the respective stages are different from each other.

Hereinbelow let us describe a method of this invention for controlling the degree of opening of movable guide vanes of a two-stage hydraulic pump-turbine when operated as a pump under the normal condition in conjunction with FIGS. 6 and 7.

Figure 6:
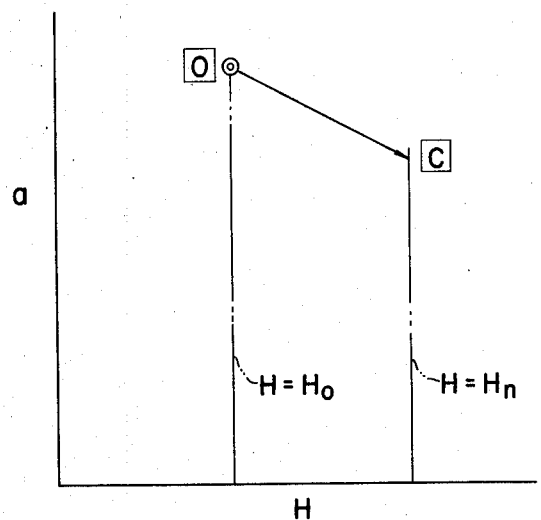
FIGS. 6 and 7 are graphs showing hydraulic characteristics when operating as a pump in accordance with this invention.

FIG. 6 shows a graph in which the degrees a of openings of the movable guide vanes 15 and 16 of the high and low pressure stages are equally controlled along a locus O→C where a total effective pumping head H is changed from the normal head $H_0$ to a head $H_m$. The relation between the total effective pumping head H and the effective pumping heads $H_1$ and $H_2$ of the high and low pressure stages in the intermediate point of this locus O→C is as follows.

$$\left. \begin{array}{r} H_1 + H_2 = H \\ H_1 = H_2 \end{array} \right\} \quad (5)$$

Figure 7:
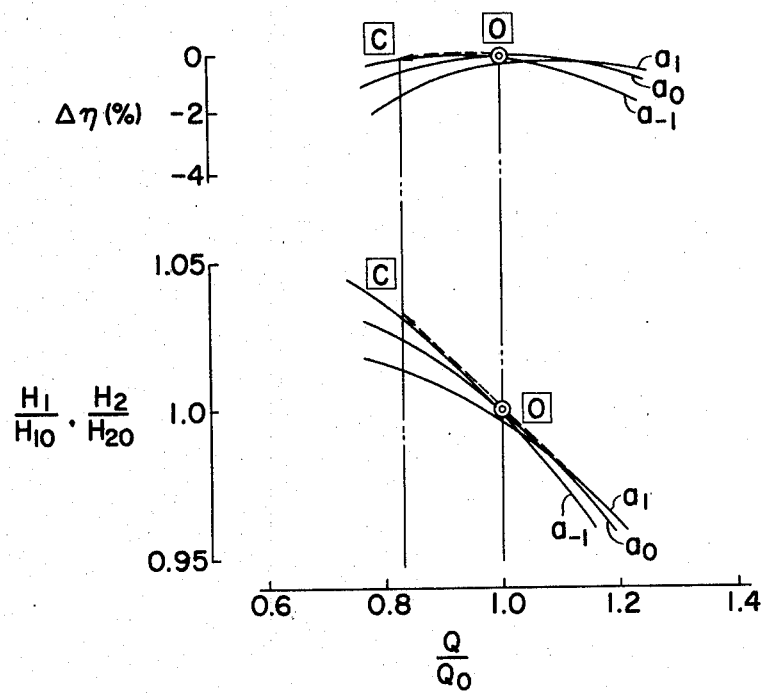

FIG. 7 shows the loci of operating conditions based on the hydraulic characteristics at the respective pressure stages in a case when the degrees a of openings of the guide vanes of the both pressure stages are controlled at the same time in accordance with the control mode shown in FIG. 6. In FIG. 7, $H_1$ designates an effective pumping head at the high pressure stage, $H_2$: an effective pumping head at the low pressure stage, Q: a flow amount, $H_{10}$, $H_{20}$, and $Q_0$: the values corresponding to $H_1$, $H_2$, and Q respectively at a time of a predetermined normal operating condition (point O in FIG. 7) in which the respective stages are operated under substantially the same hydraulic conditions, $a_0$ designates the degree of opening of the guide vanes of each stage at a predetermined normal condition, $a_1$: degree of opening of the guide vanes larger than $a_0$, $A_{-1}$: the degree of opening of the guide vanes smaller than $a_0$, and $\Delta\eta$: relative operation efficiency difference when operating as a pump with respect to the highest efficiency.

According to the characteristics shown in FIG. 7, the movable guide vanes 15 and 16 of the high and low pressure stages are equally controlled so as to be operated along the locus O→C on the envelope of hydraulic characteristic as the operating head changes. As can be understood from FIG. 7, the pump-turbine is hydraulically stably operated as a pump under the normal condition O, and in a case when the guide vanes are opened by a degree larger or smaller than the degree at the normal condition, water separation phenomenon or local secondary flow would be caused. Thus, according to the control mode described above, the high and low pressure stages are hydraulically stably operated as a pump at the same time with a high efficiency.

Figure 8:
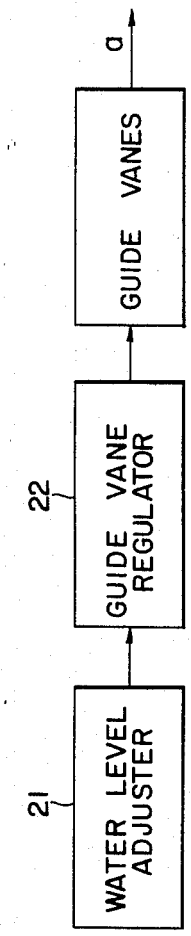
FIGS. 8 and 9 are block diagrams showing control systems for controlling guide vanes of the hydraulic pump turbine when operated under steady condition.
Figure 9:
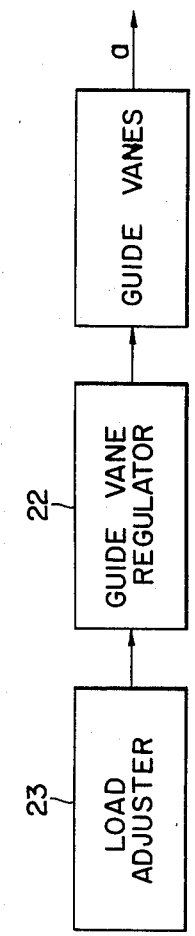

The movable guide vanes of a two-stage hydraulic pump-turbine, when operated as a turbine or pump, can be controlled by a control system, shown in FIG. 8, including a combination of a water level adjusting device 21, a guide vane regulating device 22 and guide vanes 15, 16 so as to control the degree of opening of the guide vanes in accordance with the change of the water level (i.e., operating head), or by a control system, shown in FIG. 9, including a combination of a load adjusting device 23, a guide vane regulating device 22, and the guide vanes 15, 16 so as to control the degree of opening of the guide vanes in accordance with the change of the load.

As described hereinbefore, according to this invention, in a two-stage hydraulic pump-turbine rotating at a constant speed under a steady condition, when operated as a turbine the degrees of openings of the guide vanes are controlled independently at the respective stages and when operated as a pump they are controlled equally at the respective stages when the water level or operation load changes.

I claim:

1. In a method of controlling a two-stage hydraulic pump-turbine, rotating at a constant speed under a steady condition, in which high and low pressure stages are connected through a return passage, and degrees of openings of guide vanes of said high and low pressure stages are variable, the improvement which comprises the steps of simultaneously controlling the degrees of openings of said guide vanes of said high and low pressure stages to be the same when said two-stage hydraulic pump-turbine operates as a pump, and independently controlling the degrees of openings of the guide vanes to be different when said pump-turbine operates as a turbine in accordance with a change of an operational condition at the time of the steady operation.

2. The method according to claim 1 wherein degree of opening of the guide vanes of said low pressure stage is controlled to be equal to or larger than that of said high pressure stage when said two-stage hydraulic pump-turbine operates as a turbine.

3. The method according to claim 1 wherein said operational condition is a water level.

4. The method according to claim 1 wherein said operational condition is a load of said hydraulic pump-turbine.

* * * * *